United States Patent [19]

Schulz

[11] Patent Number: 5,087,819
[45] Date of Patent: Feb. 11, 1992

[54] X-RAY DETECTOR

[75] Inventor: Reiner Schulz, Erlangen, Fed. Rep. of Germany

[73] Assignee: Siemens Aktiengesellschaft, Munich, Fed. Rep. of Germany

[21] Appl. No.: 571,123

[22] Filed: Aug. 23, 1990

[30] Foreign Application Priority Data

Sep. 6, 1989 [EP] European Pat. Off. ........ 89116452.7

[51] Int. Cl.⁵ .............................................. G01T 1/202
[52] U.S. Cl. .......................... 250/370.11; 250/370.09; 250/366; 250/367
[58] Field of Search .............. 250/370.11, 370.09, 250/361 R, 366, 367

[56] References Cited

U.S. PATENT DOCUMENTS

| 4,535,243 | 8/1985 | Peschmann | 250/370.11 X |
| 4,694,177 | 9/1987 | Akai | 250/366 X |
| 4,731,534 | 3/1988 | Klein et al. | 250/366 |
| 4,734,588 | 3/1988 | Akai | 250/370.11 |
| 4,845,363 | 7/1989 | Akai | 250/368 |
| 4,947,412 | 8/1990 | Mattson | 250/370.11 X |

FOREIGN PATENT DOCUMENTS

| 0275446 | 7/1987 | European Pat. Off. |
| 0316222 | 5/1989 | European Pat. Off. |
| 3021757 | 12/1988 | Fed. Rep. of Germany |

Primary Examiner—Carolyn E. Fields
Assistant Examiner—Drew A. Dunn
Attorney, Agent, or Firm—Hill, Van Santen, Steadman & Simpson

[57] ABSTRACT

An X-ray detector includes a scintillation crystal and a photosensor which is easily manipulated, easily positionable, and easy to contact to the scintillation crystal. The photosensor is arranged on a thin lamina having electrical contact surfaces. The lamina presses laterally against the scintillation crystal such that the photosensor covers the scintillation crystal, and the contact surfaces of the lamina are connected to corresponding contact surfaces on the scintillation crystal, or on a scintillation carrier.

11 Claims, 2 Drawing Sheets

X-RAY DETECTOR

BACKGROUND OF THE INVENTION

1. Field of the Invention

The present invention relates to an x-ray detector of the type suitable for converting the energy of x-rays incident thereon into an electrical current.

2. Description of the Prior Art

X-ray detectors are conventionally constructed of a scintillation crystal and a photosensor. The scintillation crystal converts the energy of x-ray incident thereon into light, and the photosensor converts the light emitted by the scintillation crystal into electrical signals. Such detectors are used in computer tomography devices and in baggage inspection systems, for example. In computer tomography devices, a plurality of x-ray detectors of this type are arranged in a detector row, referred to as a detector array, on which a fan-shaped x-ray beam is incident, which has penetrated the examination subject. For producing computer tomograms of a plurality of successive, parallel slices, these x-ray detectors in the detector ray can be subdivided perpendicularly relative to the fan plane to form individual detectors. Without moving the radiation receiver, it is thus possible to produce computer tomograms of successive, parallel slices.

SUMMARY OF THE INVENTION

It is an object of the present invention to provide an x-ray detector which is easily manipulable, easily positionable and easy to contact electrically.

It is a further object of the present invention to provide such an x-ray detector wherein subdivision of the x-ray detector into a plurality of individual detectors can be easily undertaken.

The above objects are achieved in accordance with the principles of the present invention in an x-ray detector wherein the photosensor is flat, and carries electrical contact surfaces. The photosensor presses laterally against the scintillation crystal such that the photosensor covers the scintillation crystal, and the contact surfaces are connected to corresponding contact surfaces on the scintillation crystal, or on a scintillation carrier.

The x-ray detector of the invention includes a scintillation crystal, possibly disposed in a recess of a scintillation carrier, against which the photosensor lies. The photosensor may, for example, be arranged in a lamina, which also carries the electrical contacts. The lamina thus electrically connects the photosensor to the contact surfaces on the scintillation crystal, or on the scintillation carrier. The external electrical connection ensues at the scintillation carrier, or at the scintillation crystal.

Several sides of the scintillation crystal, or of the scintillation carrier, can be covered by such photosensors.

DESCRIPTION OF THE PREFERRED EMBODIMENTS

Figure 1A:
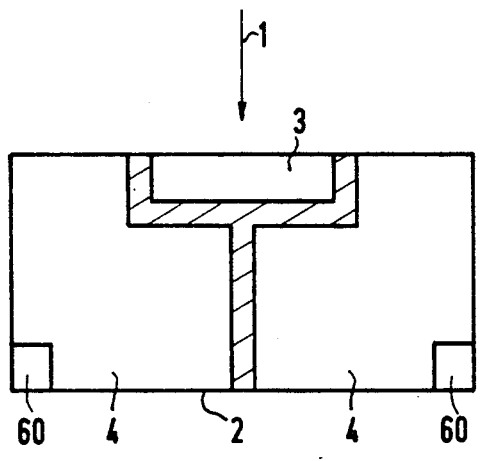
FIGS. 1a and 1b show the individual components of an x-ray detector constructed in accordance with the principles of the present invention.
Figure 1B:
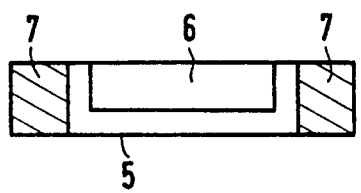

The components of an x-ray detector constructed in accordance with the principles of the present invention are shown in FIGS. 1a and 1b. The detector consists of a parallelpiped scintillation carrier (FIG. 1a) to which a thin lamina 5 having a photosensor 6 (FIG. 1b) is glued on one side or on both sides. The x-ray detector detects incoming x-rays 1. The surface of the lamina 5 lying in the plane of the drawing is glued to the surface of the scintillator 2 lying in the plane of the drawing, or parallel thereto.

The scintillation crystal 3 is arranged in the recess of a scintillation carrier 2. Parts of the scintillation carrier 2 are made electrically conductive, such as contact surfaces 4, for example by surface metalization. The scintillation carrier 2 is of such a size that easy manipulation and positioning are possible. The contact surfaces are insulated from one another by the cross-hatched regions.

The photosensor 6 may, for example, consist of amorphous silicon and may be applied on the thin lamina 5 which may be, for example, a plastic film. The photosensor 6 is fashioned so that its light-sensitive surface covers the lateral surfaces of the scintillation crystal 3 when glued onto the scintillation carrier 2. The contact surfaces 7 on the lamina 5 are arranged so as to overlie the corresponding contact surfaces 4 of the scintillation carrier 2 when glued thereon. A suitable optically transparent material is used as the glue at the light-sensitive sensor face, and a suitable electrically conductive material is used as the glue at the contact surfaces 4 and 7 to make a "direct" electrical connection (i.e., a connection not requiring a wire).

Figure 2:
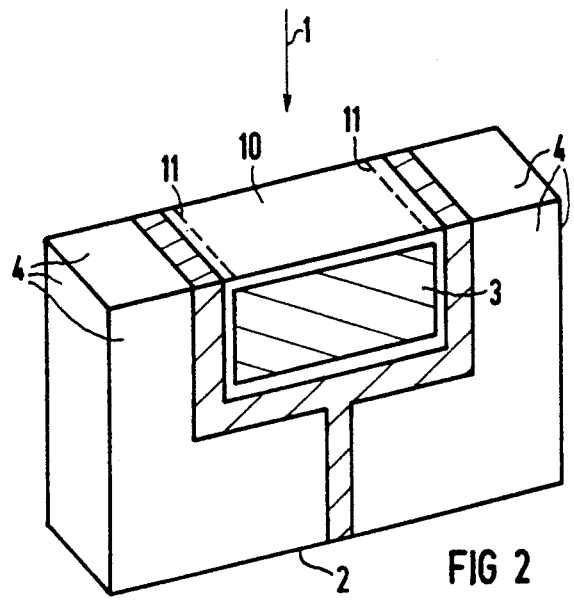
FIG. 2 is a perspective view of an assembled x-ray detector constructed in accordance with the principles of the present invention in a further embodiment.

FIG. 2 shows a specific combination of the scintillation carrier 2. In this embodiment, the base is formed by a base member, into which the scintillation crystal 3 is inserted. The scintillation crystal 3 may be surrounded by a reflective layer 10. No reflective layer is situated at the lateral surface of the scintillation crystal 3 if a photosensor is to be applied at that surface. The reflective layer 10 may be in the form of a glue filled with reflective material, for example $TiO_2$. The lines 11 represent the boundaries of the irradiated region.

Figure 3:
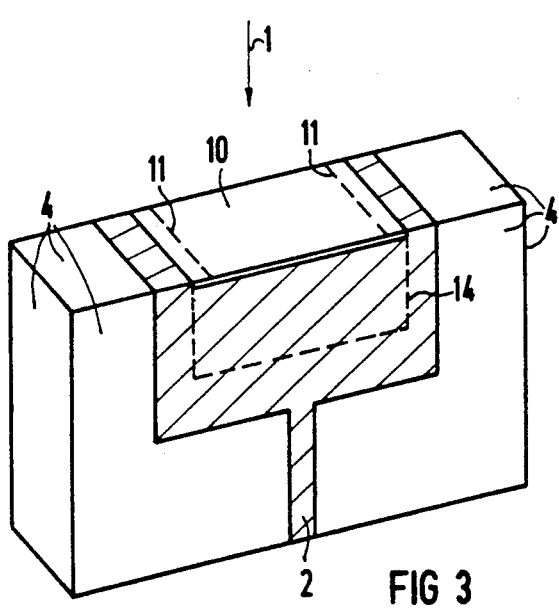
FIG. 3 is a perspective view of an assembled x-ray detector constructed in accordance with the principles of the present invention in another embodiment.

A further embodiment of the scintillation carrier 2 is shown in FIG. 3. In this embodiment, the base member consists entirely of scintillator material. The lines 11 limit the irradiated region. Line 14 limits the region from which the light emerges. To increase the light yield, the x-ray entry face may be provided with a light-reflecting layer 10. Electrically conductive surfaces 4 are applied for electrical contacting.

Figure 4A:
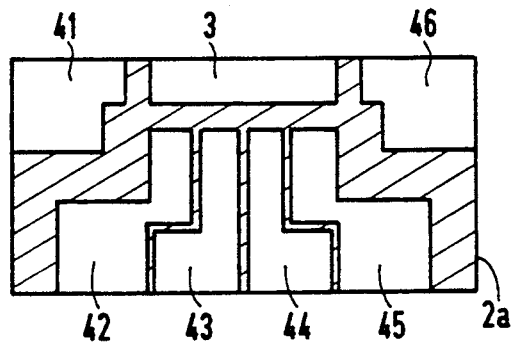
FIGS. 4a and 4b show the x-ray detector constructed in accordance with the principles of the present invention subdivided into a plurality of individual detectors.
Figure 4B:
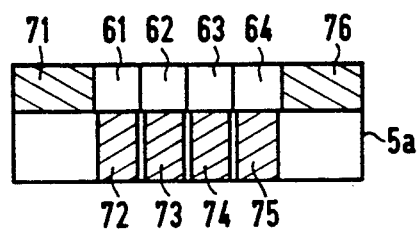

The thin photosensor 6 may be constructed so that it consists of a plurality of individual sensor elements, for example four sensor elements 61, 62, 63 and 64, as shown in FIG. 4b. The electrically conductive contact surfaces 41 through 46 of the scintillator carrier 2a are arranged so as to lie opposite the corresponding contact surfaces 71 through of the lamina 5a, when glued thereon, as shown in FIG. 4a. As a result, a plurality of individual detectors are obtained in the longitudinal direction. Given the use of such an x-ray detector in computer tomography, all data which are necessary to calculate a plurality of different tomograms can be acquired during an exposure. The contact surfaces 72 through 75 are individually allocated to the sensor elements 61 through 64, whereas the contact surfaces 71 and 76 are shared.

Figure 5:
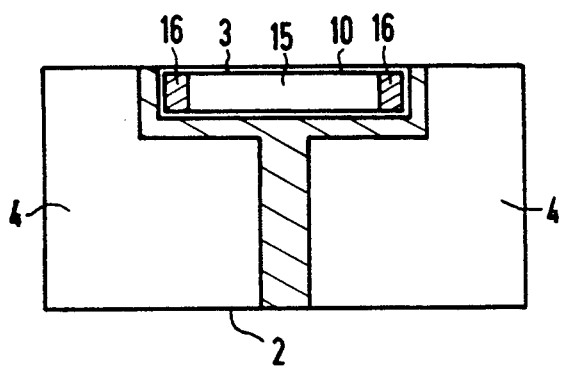
FIGS. 5 through 7 show further embodiments of an x-ray detector constructed in accordance with the principles of the present invention.

In the embodiment of FIG. 5, photodiodes are applied to the lateral surfaces of the scintillation crystals at one or both sides. The scintillation crystal 3 of FIG. 5 is introduced into the scintillation carrier 2, as shown in FIG. 2. The photosensor 15 consisting of amorphous silicon is directly laterally applied on the scintillation crystal 3. An electrical contact to the contact surfaces 4 of the scintillation carrier 2 is produced by the contact surfaces 16 of the photosensor 15. This may be accomplished, for example, by vapor-deposition of a conductor material, or by applying a conductive paste.

Figure 6:
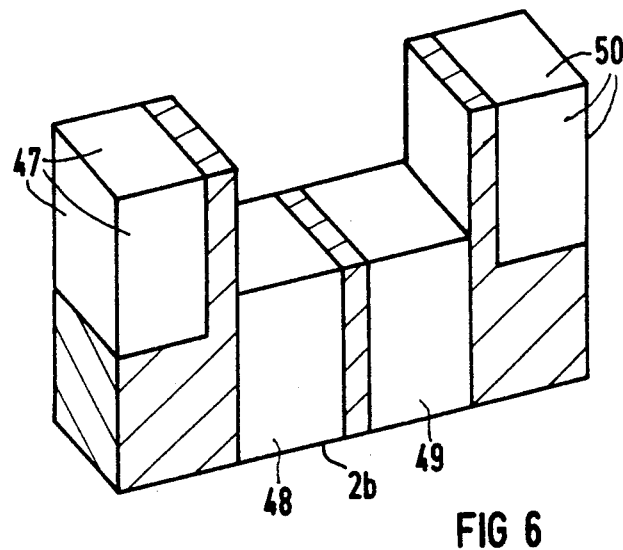
Figure 7:
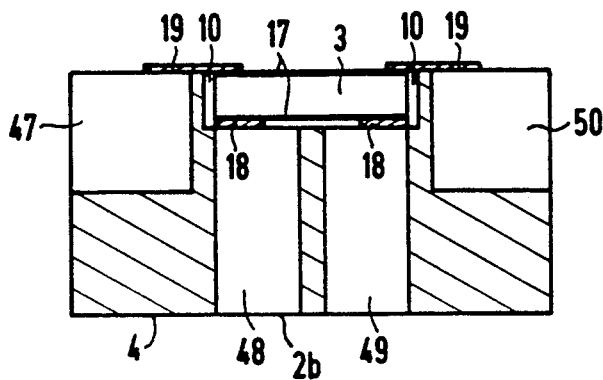

The photosensor in the embodiment of FIG. 5 may also be subdivided in a plurality of sensor elements. The photosensor may be divided to form a plurality of sensor elements in the longitudinal direction. In the embodiment of four such sensor elements, the photosensor 15 may have a structure similar to that shown in FIG. 4b. The scintillator carrier must then have the corresponding number of contact surfaces, and may, for example, be in the form of scintillation carrier of FIG. 4a. If the photosensors are applied on the underside and upperside of the scintillation crystal 3, contact surfaces 47 through 50 are provided on the scintillation carrier 2b as shown, for example, in FIG. 6. For making electrical contact with the photosensor 17, a conductive glue 18 is used at the underside of the scintillation crystal 3, and a thin electrical conductor, 19 for example, a metal or conductive paste, is used at the upperside (FIG. 7).

If a photosensor is not present at the upperside of the scintillation crystal, the structure is simplified such the upper contact surfaces 47 and 50 on the scintillation carrier 2b, and the electrical contact for the upper photosensor, can be eliminated. The scintillator surfaces which are not covered with photosensors can be provided with a light-reflecting layer 10.

The photosensors which are applied directly on the scintillation carrier or the scintillation crystal as shown in FIGS. 1a, 2, 3 or 4a may be, for example, photoresistors, photodiodes or phototransistors, consisting of amorphous silicon.

If the photosensors are applied in subdivided form on the scintillation carrier, an x-ray detector having a plurality of detector elements in the longitudinal direction is obtained, analogous to the x-ray detector shown in FIGS. 4a and 4b. This method is simpler, and fewer assembly steps are required for manufacturing this embodiment.

In addition to electrically contacting and electrically conductive regions, elements for signal editing (for example, current-to-voltage converters, amplifiers, etc.) or switching elements can be mounted on the scintillator carrier. These elements may, for example, be manufactured of amorphous silicon in thin-film technology. Such elements are schematically shown at 60 in FIG. 1.

X-ray detectors constructed in accordance with the principles of the present invention can be combined to form a detector array in an easily positionable manner. It is easy to make electrical contact with the detectors via the contact surfaces 4 and 41 through 50, for example by a direct connection to a printed circuit board with conductive glue or solder, or by an indirect connection by gluing or soldering separate electrical connections, for example, solder pins.

Although modifications and changes may be suggested by those skilled in the art, it is the intention of the inventor to embody within the patent warranted hereon all changes and modifications as reasonably and properly come within the scope of his contribution to the art.

We claim as our invention:

1. An x-ray detector comprising:
   scintillation means for converting x-ray energy into light, said scintillation means having a plurality of electrical contact surfaces; and
   a photosensor for converting said light into electrical signals disposed on at least one surface of said scintillation means, said photosensor being flat and having electrical contact surfaces attached thereto, said photosensor disposed against said at least one surface of said scintillation means so that said photosensor covers a portion of said scintillation means and such that said contact surfaces attached to said photosensor overlie and abut said contact surfaces of said scintillation means so as to allow a direct electrical connection.

2. An x-ray detector as claimed in claim 1 wherein said scintillation means consists of a scintillation crystal held in a recess of a scintillation carrier, and wherein said electrical contact surfaces of said scintillation means are disposed on said scintillation carrier.

3. An x-ray detector as claimed in claim 1 wherein said photosensor and said electrical contact surfaces attached thereto are arranged on a lamina.

4. An x-ray detector as claimed in claim 3 wherein said scintillation means includes a scintillation crystal, and further comprising optically transparent glue attaching said lamina to said scintillation crystal and electrically conductive glue attaching said lamina to said electrical contact surfaces of said scintillation means.

5. An x-ray detector as claimed in claim 1 wherein said scintillation means includes a scintillation crystal disposed in a recess of a scintillation carrier, said scintillation carrier having a first side on which said photosensor is disposed, and a plurality of remaining sides, and further comprising a light-reflective layer covering said remaining sides.

6. An x-ray detector as claimed in claim 1 wherein said scintillation means includes a scintillation crystal and wherein said scintillation crystal is larger in area than said photosensor wherein said photosensor is disposed on said scintillation crystal so that said scintillation crystal has a region surrounding said photosensor which is not covered by said photosensor, and wherein said region of said scintillation crystal not covered by said photosensor is covered by said electrical contact surfaces attached to said photosensor.

7. An x-ray detector as claimed in claim 1 wherein said photosensor is subdivided into a plurality of individual sensors, each of said individual sensors having an individual electrical contact surface attached thereto, and wherein said plurality of electrical contact surfaces on said scintillation means includes a contact surface for each electrical contact surface of said photosensor.

8. An x-ray detector as claimed in claim 1 wherein said electrical contact surfaces of said scintillation means are spaced from each other with a region consisting of scintillation crystal material disposed therebetween, and wherein said photosensor consists of a layer of amorphous silicon applied on said region.

9. An x-ray detector as claimed in claim 1 further comprising at least one electrical component for editing said electrical signals applied on said scintillator means.

10. An x-ray detector as claimed in claim 1 comprising a plurality of said photosensors respectively disposed on a plurality of sides of said scintillation means.

11. An x-ray detector as claimed in claim 1 wherein said photosensor consists of a layer of amorphous silicon, which is directly applied on said scintillator means.

* * * * *